UNITED STATES PATENT OFFICE.

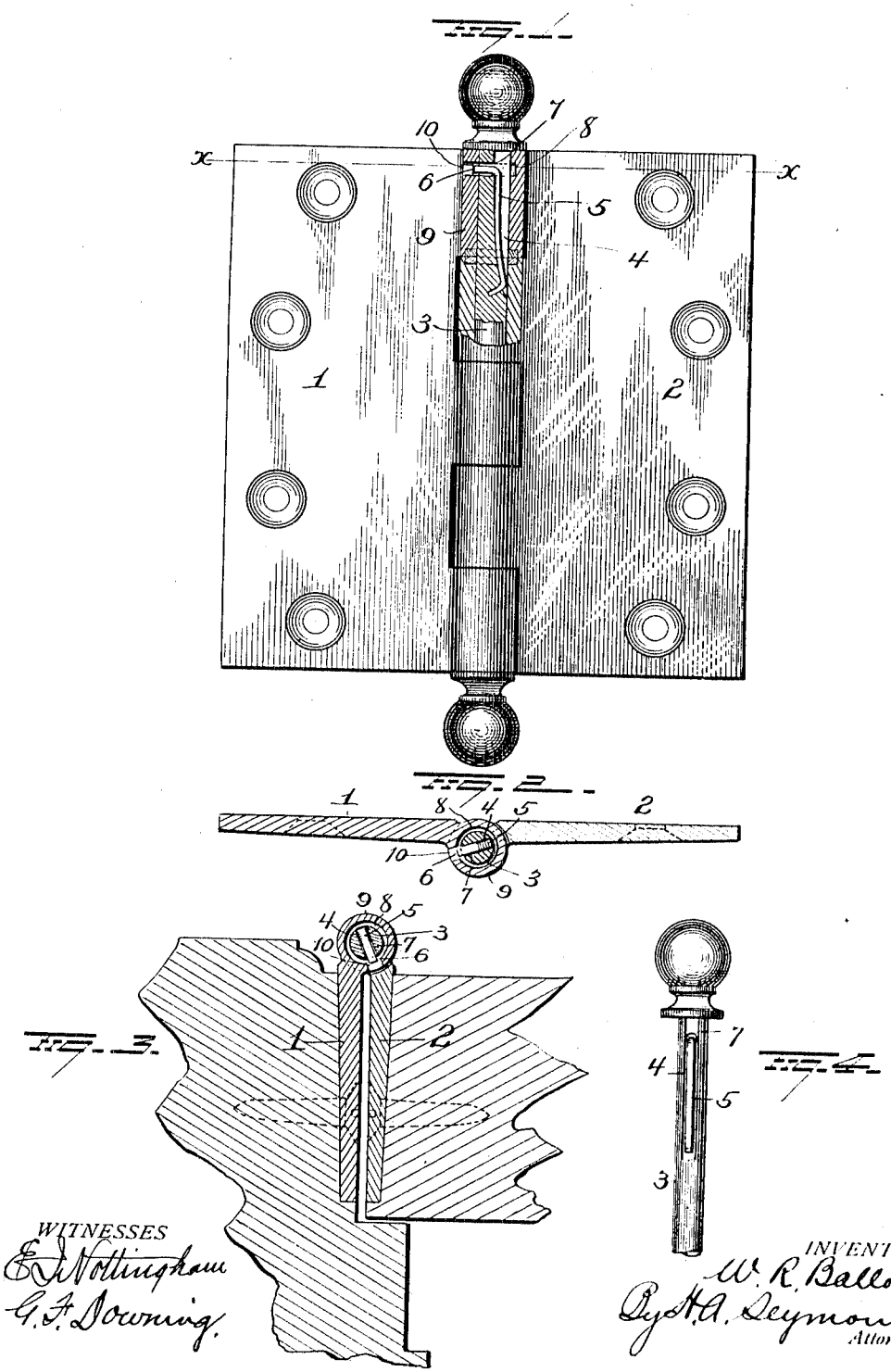

WALDO R. BALLOU, OF STAMFORD, CONNECTICUT, ASSIGNOR TO THE YALE & TOWNE MANUFACTURING COMPANY, OF STAMFORD, CONNECTICUT.

BUTT-HINGE.

1,106,181.  Specification of Letters Patent. Patented Aug. 4, 1914.

Application filed April 23, 1914. Serial No. 833,907.

*To all whom it may concern:*

Be it known that I, WALDO R. BALLOU, of Stamford, in the county of Fairfield and State of Connecticut, have invented certain new and useful Improvements in Butt-Hinges; and I do hereby declare the following to be a full, clear, and exact description of the invention, such as will enable others skilled in the art to which it appertains to make and use the same.

My invention relates to an improvement in hinges and particularly butt hinges.

With the ordinary butt hinge, wherein a loose pin holds the two leaves together, trouble is frequently caused by the pin working out of place, and by removing the pins, the door can be left in a condition where it can be readily pushed out of position so as to open it, and can be replaced, and the pins inserted, without any evidence that it has been opened or tampered with.

The object of my invention is to provide improved means for locking the pins in place, the said locking means being accessible only when the door is wholly or partly open, and it consists in the details of construction as will be more fully described and pointed out in the claims.

In the accompanying drawings, Figure 1 is a view in elevation partly in section of a hinge, showing my improvement applied thereto; Fig. 2 is a view in section on the line x—x of Fig. 1; Fig. 3 is a view in section showing it applied to a door, the latter being in its closed position and Fig. 4 is a view of the pin detached.

The hinge is composed of two leaves 1 and 2, of ordinary form united by the pin 3, which is provided at its upper end, immediately below its head, with an elongated recessed seat 4 in which the spring arm 5, is located and secured.

This spring arm 5 is secured in any suitable manner, at its lower end to the pin 3, and its upper free end is bent at right angles to the body of the arm to form a tongue 6 which passes through the slot 7 in the pin, and enters the annular groove 8 in the upper knuckle 9 of the leaf 1, thus locking the pin 3 to hinge leaf 1. This annular groove 8 is so located with relation to the tongue 6 on spring arm 5, that when the pin is in its normal position, the tongue 6 rests in said annular groove, the upper wall of which forms a shoulder which prevents the accidental displacement of the pin 3. This not only prevents the pin from creeping upward, but also prevents it from being withdrawn except by forcing the spring tongue toward the pin, which may be done by turning the pin until the end of the spring tongue 6 alines with the open slot 10 formed in the knuckle 9, and communicating with the annular groove 8 within the knuckle, and then pushing the tongue inwardly, by a suitable instrument inserted through the outer open end of slot 10, until it is clear of the annular groove 8. The pin 3 is then free to be withdrawn, ample clearance in the recessed seat 4 in the pin being provided for the free movement of the spring arm 5. By inserting the pin 3 in the knuckle, and pushing downwardly on the pin, the spring arm 5 will yield and permit the tongue 6 on the end of said spring arm to pass into the knuckle and as soon as the tongue 6 of the spring reaches the annular groove 8 it will spring outwardly into the latter and thus lock the pin in place. The spring holds the pin against the possibility of working or creeping upwardly, and the slot 10 in knuckle 9 is so located that when the door is closed, the slot is not accessible, hence in order to get at the spring tongue 6 it is first necessary to partly open the door so as to uncover the slot, and then by turning the pin 3 if necessary, and introducing a suitable tool, the tongue 6 may be pushed inwardly to disengage it from the knuckle 9. After the spring has been disengaged from the knuckle, the pin may be withdrawn, and may be again locked, by inserting it in the knuckles and forcing it down until the tongue of the spring again enters the groove 8 in the knuckle 9. The pin thus becomes locked to the leaf 1, which is secured to the jamb, and forms a pivot on which the other leaf 2 of the hinge turns, and in addition to being held against upward creeping movement, is also guarded against surreptitious removal.

Having fully described my invention what I claim as new and desire to secure by Letters-Patent, is:—

1. A hinge consisting of two leaves, a knuckle of one of which is provided with an annular groove, a connecting pin the latter having a recessed seat, and a spring within said seat and provided with a tongue adapted to enter the groove in said knuckle, whereby the pin will be locked against accidental displacement.

2. A hinge consisting of two leaves and a connecting pin, the latter having a recessed seat, and a spring arm secured within said seat in the pin with its free end passing through a slot in the latter, the free end of said spring projecting beyond the pin and accessible through an open slot in one of the leaves of the hinge.

3. A hinge consisting of two leaves and a connecting pin, the pin being provided with a spring tongue adapted normally to rest in a groove or channel of one leaf of the hinge, said leaf being also provided with a slot reaching from the exterior of said leaf to connect with the groove whereby the tongue may be pushed out of engagement with said leaf to permit of the withdrawal of the pin.

In testimony whereof, I have signed this specification in the presence of two subscribing witnesses.

WALDO R. BALLOU.

Witnesses:
SCHUYLER MERRITT,
WILLIAM P. MOSELY.

Copies of this patent may be obtained for five cents each, by addressing the "Commissioner of Patents, Washington, D. C."